(12) United States Patent
Loewe

(10) Patent No.: US 10,851,823 B2
(45) Date of Patent: Dec. 1, 2020

(54) DEVICE FOR FASTENING TO A FASTENING PROJECTION OF A CARRIER COMPONENT

(71) Applicant: ILLINOIS TOOL WORKS INC., Glenview, IL (US)

(72) Inventor: Hubert Loewe, Weselberg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 16/432,636

(22) PCT Filed: Dec. 12, 2017

(86) PCT No.: PCT/US2017/065742
§ 371 (c)(1),
(2) Date: Jun. 5, 2019

(87) PCT Pub. No.: WO2018/118513
PCT Pub. Date: Jun. 28, 2018

(65) Prior Publication Data
US 2019/0309782 A1    Oct. 10, 2019

(30) Foreign Application Priority Data

Dec. 19, 2016   (DE) .................. 10 2016 124 797

(51) Int. Cl.
| F16B 21/07 | (2006.01) |
| F16B 21/06 | (2006.01) |
| F16B 5/06  | (2006.01) |

(52) U.S. Cl.
CPC .......... *F16B 21/073* (2013.01); *F16B 21/065* (2013.01); *F16B 5/0642* (2013.01); *F16B 5/0664* (2013.01)

(58) Field of Classification Search
CPC ............... A44B 11/2557; Y10T 24/344; Y10T 24/3445; F16B 21/073; F16B 21/065
See application file for complete search history.

(56) References Cited

U.S. PATENT DOCUMENTS 3,916,756 A * 11/1975 Yoda ..................... F16B 21/073
                                                  24/682.1
4,408,372 A * 10/1983 Kimura ................. F16B 21/073
                                                  24/662

(Continued)

FOREIGN PATENT DOCUMENTS

| CN | 102362083 A | 2/2012 |
| CN | 103038105 A | 4/2013 |

(Continued)

OTHER PUBLICATIONS

PCT, International Preliminary Report on Patentability and Written Opinion of the International Searching Authority, International Application No. PCT/US2017/065742; dated Jun. 25, 2019, 7 pages.

(Continued)

*Primary Examiner* — Robert Sandy
(74) *Attorney, Agent, or Firm* — Thompson Hine LLP

(57) ABSTRACT

A device for fastening to a fastening projection (30), which has an undercut, of a carrier component (28), including a housing portion (10) which forms an insertion portion (12) for the fastening projection, at least two elastic latching arms (22) being provided which extend into the insertion portion and which are designed, at first starting from a rest form, to deform, in the course of inserting the fastening projection into the insertion portion, elastically in the insertion direction of the fastening projection and, with a subsequent return to shape, to latch on the undercut of the fastening projection, wherein furthermore at least one latching-arm support (24) is formed on the housing portion and opposes a deformation of the latching arms from their rest form in an opposite direction to the insertion direction of the fastening projection.

10 Claims, 3 Drawing Sheets

(56) References Cited

U.S. PATENT DOCUMENTS

| | | | |
|---|---|---|---|
| 4,467,988 A | 8/1984 | Kraus | |
| 5,302,070 A | 4/1994 | Kameyama | |
| 6,264,393 B1* | 7/2001 | Kraus | B60R 13/0206 |
| | | | 24/297 |
| 8,776,326 B2* | 7/2014 | Clarke | B60R 13/0206 |
| | | | 24/297 |
| 2013/0125372 A1 | 5/2013 | van Niekerk | |
| 2013/0216297 A1 | 8/2013 | Albach | |
| 2016/0123363 A1 | 5/2016 | Hammer | |
| 2016/0238058 A1 | 8/2016 | Sbongk | |

FOREIGN PATENT DOCUMENTS

| | | |
|---|---|---|
| CN | 105339684 A | 2/2016 |
| DE | 102010004686 A1 | 7/2011 |
| DE | 10 2010 030 964 A1 | 1/2012 |
| DE | 10 2012 214 453 B3 | 6/2014 |
| DE | 10 2013 214 269 B3 | 6/2014 |
| DE | 10 2014 103 535 A1 | 4/2015 |
| EP | 2131084 A2 | 12/2009 |
| WO | WO 2014/082848 A1 | 6/2014 |

OTHER PUBLICATIONS

PCT, International Search Report and Written Opinion, International Application No. PCT/US2017/065742; dated Mar. 12, 2018, 12 pages.

\* cited by examiner

US 10,851,823 B2

DEVICE FOR FASTENING TO A FASTENING PROJECTION OF A CARRIER COMPONENT

TECHNICAL FIELD

The invention relates to a device for fastening to a fastening projection, which has an undercut, of a carrier component, comprising a housing portion which forms an insertion portion for the fastening projection, at least two elastic latching arms being provided which extend into the insertion portion and which are designed, at first starting from a rest form, to deform, in the course of inserting the fastening projection into the insertion portion, elastically in the insertion direction of the fastening projection and, with a subsequent return to shape, to latch on the undercut of the fastening projection

BACKGROUND

Such devices are used to fasten components to a carrier component of an automobile. For example, cladding parts, electric cables or liquid lines can be fastened to body carrier components of the automobile. For this purpose, the carrier component has a fastening projection on which the device can be latched. The component to be fastened to the carrier component is mounted on the device.

Such a device is known for example from DE 10 2013 214 269 B3. It has a housing in which there are provided a plurality of elastic latching arms which latch on an undercut formed between two balls of a fastening projection with multi-ball geometry. This device is simple to produce and to mount. Thus, for mounting, the device need only be plugged onto the fastening projection. Fundamentally, there is a wish to have a mounting force which is as low as possible combined at the same time with a retaining force in operation which is as high as possible. Since in the case of said device the force required for demounting the device from the fastening projection is substantially identical to the force required for mounting, a conflict of goals exists in this regard.

To resolve this conflict of goals, two-part devices are known for example from WO 2014/082848 A1, DE 10 2010 030 964 A1, DE 10 2012 214 453 B3 and DE 10 2014 103 535 A1. A first part of the device can be plugged onto the fastening projection, with latching engagement of elastic latching elements, and then a, for example clip-shaped, second part can be mounted on the first part, the second part preventing a release of the latching engagement. Such devices make it possible to achieve a small mounting force and at the same time a considerably higher retaining force in operation. However, two-part devices present complications in terms of manufacture and mounting.

Taking the explained prior art as a starting point, it is an object of the invention to provide a device of the type stated at the outset by means of which a small mounting force and at the same time a high demounting force can be achieved in a simple manner in manufacturing and mounting terms.

SUMMARY

The invention achieves the object through the subject matter of claim 1. Advantageous embodiments can be found in the dependent claims, the description and the figures.

For a device of the type stated at the outset, the invention achieves the object in that at least one latching-arm support is formed on the housing portion and opposes a deformation of the latching arms from their rest form in an opposite direction to the insertion direction of the fastening projection.

The device according to the invention serves for fastening a component to the carrier component, in particular a carrier component of an automobile. The carrier component may be, for example, a body part. The component to be fastened may be, for example, a cladding part or an electric cable or liquid line.

The device according to the invention comprises a housing portion which forms an insertion portion for inserting the fastening projection. The housing portion can be cage-shaped, for example. With its inner wall or its inner walls, it can delimit an insertion portion having, for example, a substantially circular or rectangular cross section for inserting the fastening projection. The fastening projection can be welded to the carrier component, for example. Elastic latching arms extend into the insertion portion of the housing portion. The elastic latching arms can extend into the insertion portion in particular in the radial direction. They can be integrally formed on one or more inner walls of the housing portion that delimit the insertion portion. The elastic latching arms have a rest form from which they can be elastically deformed. The rest form is the form in which the latching arms are situated without the fastening projection inserted into the insertion portion. The elastic deformation of the latching arms occurs when inserting the fastening projection into the insertion portion starting from their rest form in the insertion direction. After overcoming the largest cross section of the fastening projection, the latching arms return to shape in the direction of their rest form, with the latching arms latching releasably on an undercut of the fastening projection. Here, the latching arms can return completely to shape into their rest form. However, this is not imperative. It depends on the geometry of the fastening projection.

Demounting of the device from the fastening projection is also possible according to the invention. However, a greater force must be applied for demounting than for mounting. For this purpose, at least one latching-arm support is provided according to the invention, which latching-arm support opposes a deformation of the latching arms from their rest form in an opposite direction to the direction of insertion of the fastening projection into the insertion portion for releasing the latching engagement, namely in particular in such a way that, for a release of the latching arms from the latching engagement on the undercut of the fastening projection, a greater force is required than for the latching engagement of the latching arms on the undercut. Thus, the housing portion must deform overall for releasing the latching engagement of the latching arms. In particular, the wall of the housing portion that forms the insertion portion or the walls of the housing portion that form the insertion portion must bulge outward so that the latching arms can be released from the undercut. This is because the latching-arm support prevents an elastic deformation of the latching arms that is required for the release of the latching engagement counter to the insertion direction of the fastening projection. Since the latching-arm support acts only in a direction counter to the insertion direction, the mounting of the device is, by contrast, possible with the desired low mounting force. The demounting force, in particular pulling force, required according to the invention can be, for example, at least three times as much, preferably at least five times as much, as the required mounting force, in particular pressing force. Accordingly, the device according to the invention provides a high retaining force in operation without a separate component, for example a fastening clip, being required for this purpose.

The latching-arm support can extend into the insertion portion, in particular in the radial direction. The latching-arm support can, furthermore, be integrally formed on an inner wall of the housing portion that delimits the insertion portion. A plurality of latching-arm supports can also be provided, in particular as many latching-arm supports as are provided latching arms. However, it is also possible for example for a plurality of latching-arm supports to be provided per latching arm, for example two latching-arm supports per latching arm. According to one example, two latching arms can be provided. However, it is also possible for more than two latching arms to be provided.

The device according to the invention can be formed in one piece. It can be produced, for example, by a plastic injection-molding process. As already explained, only one part, namely the in particular one-piece device according to the invention, is required according to the invention for fastening to the fastening projection of the carrier component. The production is simplified. The same applies to the transportation to the assembly site and to the mounting and demounting operations.

According to a further embodiment, a spacing, preferably a spacing of less than 2 mm, more preferably of less than 1 mm, can be present between the latching arms and the at least one latching-arm support in the rest form of the latching arms. Thus, by virtue of this spacing, the latching-arm support permits a slight elastic deformation of the latching arms from their rest form counter to the insertion direction of the fastening projection into the insertion portion. However, this permitted deformation is not sufficient to release the latching of the latching arms from the undercut. Suitable choice of the spacing and of the geometry of the latching-arm support makes it possible for the required demounting force to be set in a flexible manner.

According to a further embodiment, elastic retaining portions can be arranged on the outer side of the housing portion and are designed to lie on the carrier component in the state in which the device is fastened to the fastening projection. In the mounted state, the elastic retaining portions lie from above on the carrier component in particular in a state in which they are slightly elastically deformed from their rest form. Owing to their elastic deformation, they bear with a slight pressing force. The retaining portions prevent undesired noises, for example rattling noises, resulting from vibrations in operation as occur in particular in automobiles.

According to a further embodiment, furthermore at least one carrying portion can be arranged on the housing portion and is designed to carry at least one component to be fastened to the carrier component. The at least one carrying portion can be arranged on an outer side or an upper side of the housing portion that faces away from the carrier component in the mounted state. As already mentioned, the at least one carrying portion can be provided for example for carrying at least one cable or line or at least one cladding part or the like.

The invention also relates to a system consisting of a carrier component with a fastening projection having an undercut and of a device according to the invention. The latching arms can be latched on the undercut of the fastening projection. The system can also comprise at least one component which is retained on at least one carrying portion and thus fastened to the carrier component.

According to a further embodiment, the fastening projection can have a ball shape or a multi-ball shape. In the case of a multi-ball shape, a plurality of balls, for example two balls, are arranged behind one another in the direction of insertion of the fastening projection into the insertion portion. The undercut can then be formed between the balls. However, the fastening projection can also be a threaded bolt, for example. The thread profile then forms a plurality of undercuts. The fastening projection can also be a differently formed bolt with at least one undercut.

It is also conceivable for the fastening projection to have at least two undercuts, with the latching arms being designed to latch in different mounting positions on different ones of the undercuts. The undercuts are formed behind one another in the insertion direction of the fastening projection or the axial direction of the fastening projection which can correspond to the insertion direction. In this way, the device can latch, for example, on a first undercut in a premounted position and latch on a second undercut in a completely mounted position.

BRIEF DESCRIPTION OF THE DRAWINGS

An exemplary embodiment of the invention is explained in more detail below with reference to figures, in which schematically.

Unless stated otherwise, identical reference signs in the figures designate identical items.

DETAILED DESCRIPTION

Figure 2:
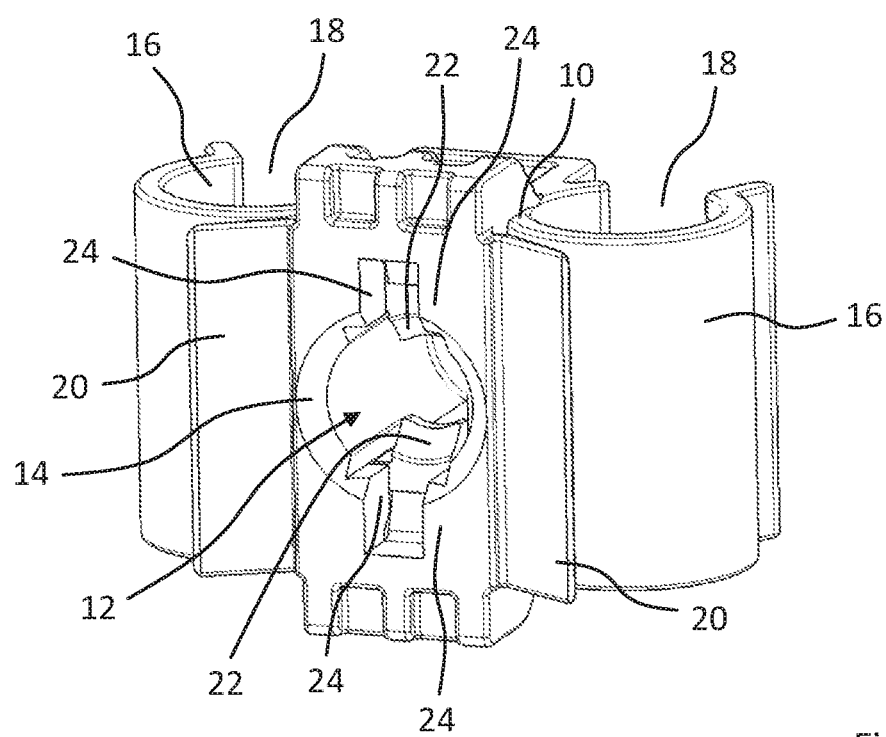
FIG. 2 shows the device from FIG. 1 in a second perspective view.
Figure 3:
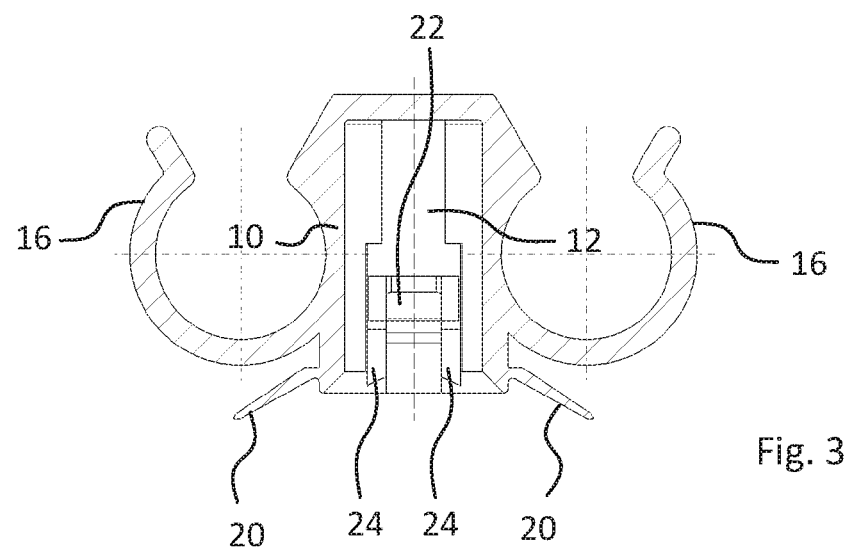
FIG. 3 shows the device from FIG. 1 in a first sectional view.

The device according to the invention has a housing portion 10 which forms an insertion portion 12 for inserting a fastening projection having an undercut. The insertion opening which is circular in the example shown with a conical insertion surface is shown with the reference sign 14 in FIG. 2. In the example shown, two carrying portions 16 are integrally formed on opposite outer sides of the housing portion 10 and have a respective receiving opening 18 in the example shown. An electrical cable, for example, can be received in each of the receiving openings 18. In particular, the cables can be received in the receiving openings 18 by snap-fastening, as is known per se. In addition, two elastic retaining portions 20 are integrally formed at the end of the housing portion 10 having the insertion surface 14.

Figure 4:
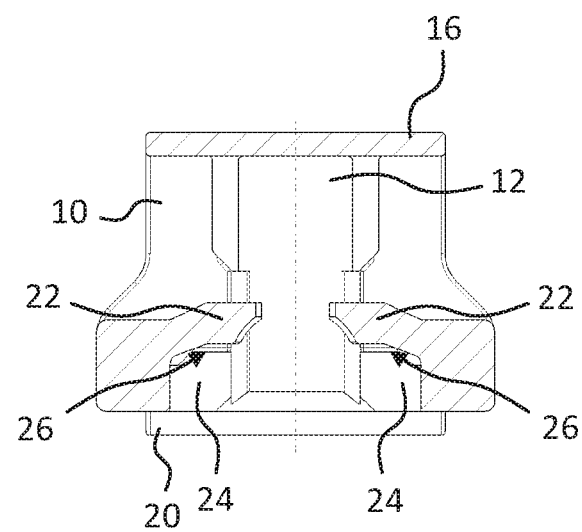
FIG. 4 shows the device from FIG. 1 in a second sectional view rotated through 90° with respect to FIG. 3.
Figure 5:
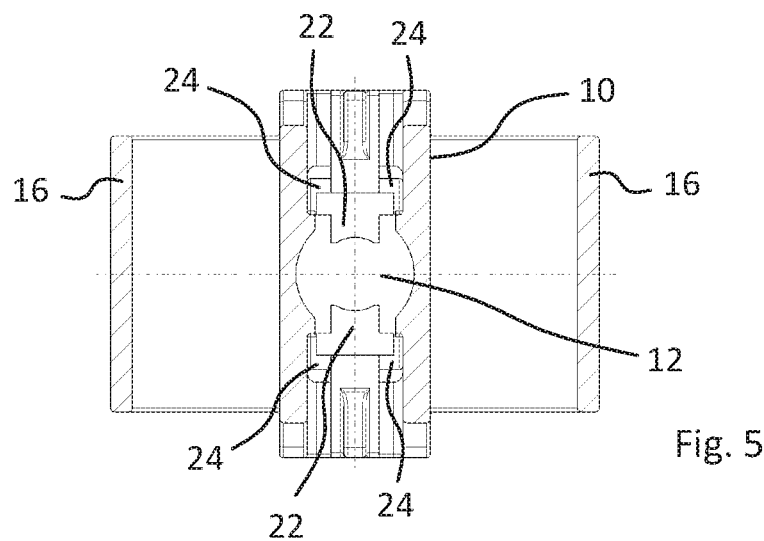
FIG. 5 shows a further sectional view of the device from FIG. 1.

In the example illustrated, there are additionally integrally formed on the housing portion 10 two elastic latching arms 22 which extend radially toward one another into the insertion portion 12 from opposite directions. Four latching-arm supports 24 are also integrally formed on the housing portion 10 in the example shown, with in each case two latching-arm supports 24 being assigned to a latching arm 22. In the sectional views of FIGS. 4, 6 and 7, in each case only one of the latching-arm supports 24 can be seen per latching arm 22. The latching-arm supports 24 are situated between the latching arms 22 and the plane defined by the insertion opening 14 of the insertion portion 12. In the sectional illustrations of FIGS. 4, 6 and 7, the latching-arm supports 24 are thus below the latching arms 22. In the rest form of the elastic latching arms 22 that is shown for example in FIG. 4, there is a small spacing 26, in the example shown of less than 1 mm, between the latching arms 22 and the latching-arm supports 24 assigned thereto.

Figure 1:
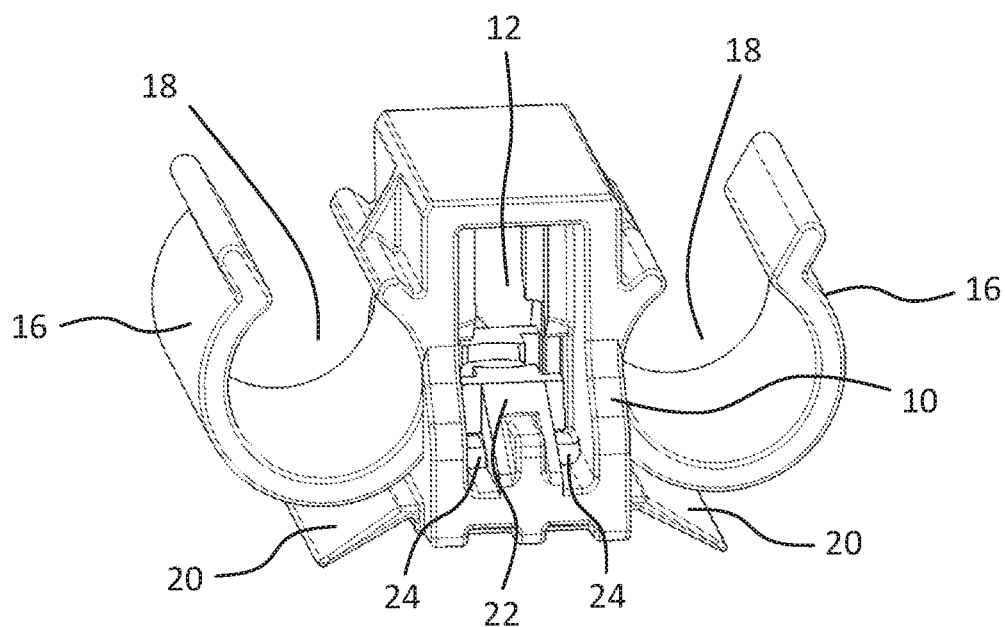
FIG. 1 shows a device according to the invention in a first perspective view.
Figure 6:
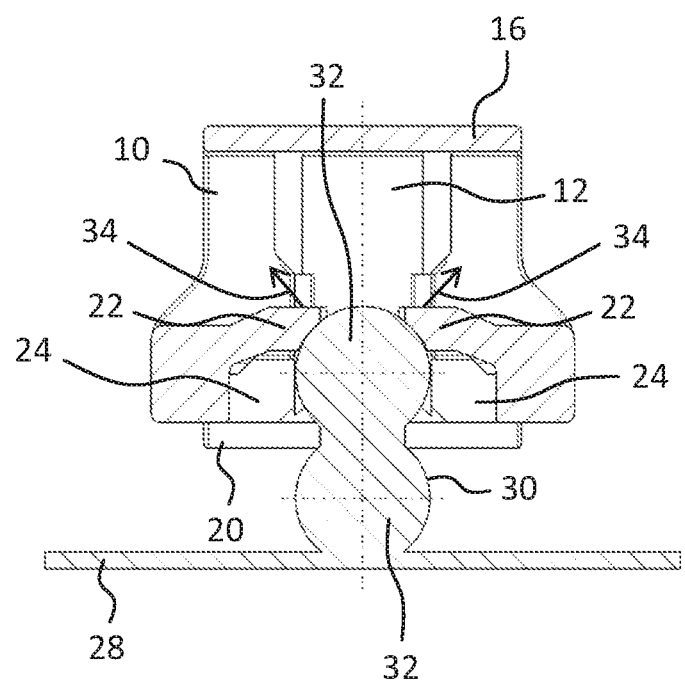
FIG. 6 shows the device from FIGS. 1 to 5 in a premounted state in a sectional view corresponding to FIG. 4.
Figure 7:
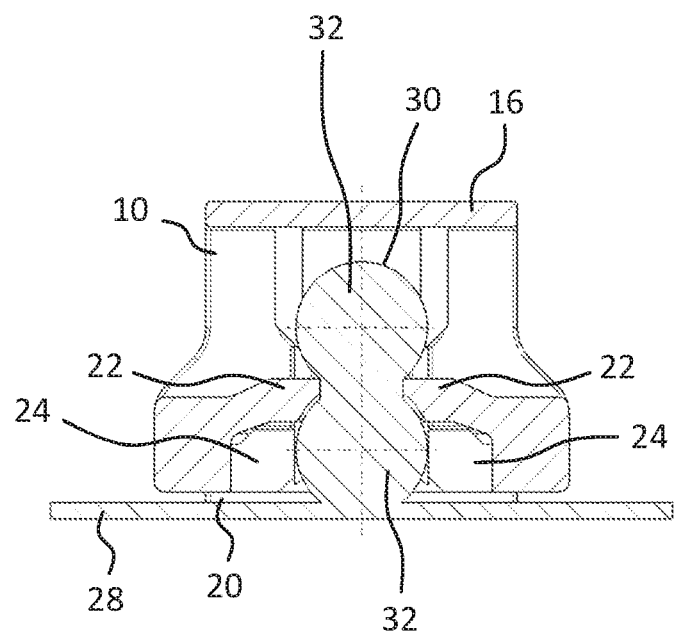
FIG. 7 shows the illustration from FIG. 6 in the completely mounted state on a carrier component.

The mounting of the device according to the invention will be explained with reference to FIGS. 6 and 7. In this respect, a carrier component, for example a body component of an automobile, is shown with the reference sign 28 in FIGS. 6 and 7. A fastening projection 30, which in the present case has a double-ball shape, is welded onto the carrier component 28. In particular, the fastening projection 30 is formed by two balls 32 which are placed one on the other. In the example shown, the balls 32 are welded to one another and to the carrier component 28. An undercut is formed by the constriction between the balls 32. FIG. 6 shows the position of the device directly prior to the mounting on the carrier component 28. It can be seen that the cross section of the balls 32 is greater than the clear width between the elastic latching arms 22 in their rest form. If, starting from the state shown in FIG. 6, the device is pressed further onto the fastening projection 30 such that the fastening projection 30 is inserted into the insertion portion 12 in an insertion direction, upward in FIG. 6, the elastic latching arms 22 are first of all elastically deformed in the insertion direction of the fastening projection 30, as illustrated by the arrows 34 in FIG. 6. After overcoming the upper ball 32 of the fastening projection 30, the elastic latching arms 22 move back into their rest form with releasable latching on the undercut formed by the balls 32, as can be seen in the mounted state of the device on the carrier component 28 as shown in FIG. 7. In this state, the elastic retaining portions 20 lie on the upper side of the carrier component 28 in a state in which they are elastically slightly deformed from their rest form which can be seen, for example, in FIG. 1. This mounting of the device is simple and possible with little mounting force.

If the device is to be demounted again from the carrier component 28, a corresponding pulling force must be exerted on the device, upward in FIG. 7. Here, the latching-arm supports 24 prevent a situation in which the latching arms 22, after overcoming the small spacing 26 and the associated bearing of the elastic latching arms 22 on the upper sides of the latching-arm supports 24, for a release of the latching engagement on the fastening projection 30, can deform elastically in an opposite direction to the insertion direction, that is to say downward in FIG. 7. In order to demount the device from the fastening projection 30, the housing portion 10 has to be bent up outward such that the elastic latching arms 22 can be released from the undercut formed by the ball 32. The demounting force required for this purpose is considerably higher than the mounting force required for mounting the device.

The device according to the invention is formed in one piece in the example shown, with the result that the production of the device is simplified. For example, the device can be produced in a simple manner by a plastic injection-molding process.

LIST OF REFERENCE SIGNS

10 Housing portion
12 Insertion portion
14 Insertion opening
16 Carrying portion
18 Receiving opening
20 Retaining portion
22 Latching arm
24 Latching-arm support
26 Spacing
28 Carrier component
30 Fastening projection
32 Ball
34 Arrow

The invention claimed is:

1. A device for fastening to a fastening projection (30), which has an undercut, of a carrier component (28), comprising a housing portion (10) which forms an insertion portion (12) for the fastening projection (30), at least two elastic latching arms (22) being provided which extend into the insertion portion (12) and which are designed, at first starting from a rest form, to deform, in the course of inserting the fastening projection (30) into the insertion portion (12), elastically in the insertion direction of the fastening projection (30) and, with a subsequent return to shape, to latch on the undercut of the fastening projection (30), characterized in that furthermore at least one latching-arm support (24) is formed on the housing portion (10) and opposes a deformation of the latching arms (22) from their rest form in an opposite direction to the insertion direction of the fastening projection (30).

2. The device as claimed in claim 1, characterized in that the device is formed in one piece.

3. The device as claimed in claim 1, characterized in that a spacing (26) of less than 2 mm is present between the latching arms (22) and the at least one latching-arm support (24) in the rest form of the latching arms (22).

4. The device as claimed in claim 1, characterized in that furthermore elastic retaining portions (20) are arranged on the outer side of the housing portion (10) and are designed to lie on the carrier component (28) in the state in which the device is fastened to the fastening projection (30).

5. The device as claimed in claim 1, characterized in that furthermore at least one carrying portion (16) is arranged on the housing portion (10) and is designed to carry at least one component to be fastened to the carrier component (28).

6. A system consisting of a carrier component (28) with a fastening projection (30) having an undercut and of a device as claimed in claim 1 connected to the projection.

7. The system as claimed in claim 6, characterized in that the fastening projection (30) has a ball shape or a multi-ball shape.

8. A fastening device for connection to a fastening projection having an undercut, the fastening device comprising:
   a housing portion (10) with an insertion opening for receiving the fastening projection,
   at least two elastic latching arms (22) extending into the insertion opening, each latching arm having a rest position and configured to deform, in the course of inserting the fastening projection (30) in an insertion direction into the insertion opening, elastically in the insertion direction with a subsequent return toward the rest position in order to latch on the undercut of the fastening projection,
   wherein at least one latching-arm support (24) is formed on the housing portion (10) and opposes a deformation of the latching arms (22) from their rest position in a direction opposite to the insertion direction.

9. The fastening device as claimed in claim 8, wherein the fastening device is formed as one molded piece.

10. The fastening device of claim 8, wherein a spacing (26) of less than 2 mm is present between each of the latching arms (22) and the at least one latching-arm support (24) when each latching arm is in its rest position.

\* \* \* \* \*